(12) United States Patent
Cabrele et al.

(10) Patent No.: US 7,682,116 B2
(45) Date of Patent: Mar. 23, 2010

(54) ANCHOR DEVICE OF WOODEN OR METAL STRUCTURES TO A WALL

(75) Inventors: Federico Cabrele, Piazzola Sul Brenta (IT); Michele Lucon, Cittadella (IT)

(73) Assignee: ITW Construction Products Italy S.R.L. Con Unico Socio, Padua (IT)

(*) Notice: Subject to any disclaimer, the term of this patent is extended or adjusted under 35 U.S.C. 154(b) by 152 days.

(21) Appl. No.: 11/837,433

(22) Filed: Aug. 10, 2007

(65) Prior Publication Data
US 2008/0085168 A1    Apr. 10, 2008

(30) Foreign Application Priority Data
Aug. 11, 2006   (IT)  ............... TO06A0599

(51) Int. Cl.
F16B 13/12   (2006.01)

(52) U.S. Cl. .................. 411/80.5; 411/49; 411/71; 411/451.1; 411/451.3; 411/455; 411/456

(58) Field of Classification Search .................. 411/32, 411/44, 49, 55, 71–74, 80.1, 80.2, 80.5, 80.6, 411/451.1, 451.3, 451.5, 455, 456
See application file for complete search history.

(56) References Cited

U.S. PATENT DOCUMENTS

| | | | | | |
|---|---|---|---|---|---|
| 777,399 | A | * | 12/1904 | Church | 411/55 |
| 2,384,918 | A | * | 9/1945 | Houk | 411/548 |
| 2,470,924 | A | * | 5/1949 | Flogaus | 411/80.6 |
| 3,000,254 | A | * | 9/1961 | Hottenstein | 411/53 |
| 3,065,659 | A | | 11/1962 | Eriksson et al. | |
| 3,323,404 | A | * | 6/1967 | Fischer | 411/80.5 |
| 3,383,976 | A | * | 5/1968 | Schenkel | 411/62 |
| 3,516,324 | A | * | 6/1970 | Berner | 411/72 |
| 3,555,960 | A | * | 1/1971 | White | 411/80.5 |
| 3,717,067 | A | * | 2/1973 | Vick et al. | 411/455 |
| 4,003,175 | A | * | 1/1977 | Patry | 52/506.05 |

(Continued)

FOREIGN PATENT DOCUMENTS

BE        857694 A1    12/1977

(Continued)

OTHER PUBLICATIONS

Office Action for AU 2007205735 mailed Sep. 15, 2008.

(Continued)

*Primary Examiner*—Victor Batson
*Assistant Examiner*—Roberta Delisle
(74) *Attorney, Agent, or Firm*—Lowe Hauptman Ham & Berner, LLP (57) ABSTRACT

An anchor device includes an expansion bolt and a fastening screw. The bolt has a tubular body. The tubular body further has a central shank and a head, which is integrally made with the central shank and has a full solid body on which a pair of longitudinal reciprocally perpendicular through slots are made which delimit four anchor segments adapted to spread outwards under the bias of the fastening screw. The central shank has a first portion arranged next to the head on which a plurality of longitudinal through slots define longitudinal anchoring tabs which expand radially outwards under the bias of the fastening screw following the spreading of the four anchor segments.

4 Claims, 4 Drawing Sheets

U.S. PATENT DOCUMENTS

| | | | |
|---|---|---|---|
| 4,142,440 A * | 3/1979 | Schefer | 411/42 |
| 4,210,057 A * | 7/1980 | Goring et al. | 411/37 |
| 4,322,194 A * | 3/1982 | Einhorn | 411/30 |
| 4,360,301 A * | 11/1982 | Mosberger | 411/80.5 |
| 4,609,316 A * | 9/1986 | Oettl | 411/45 |
| 4,840,523 A * | 6/1989 | Oshida | 411/48 |
| 5,340,257 A * | 8/1994 | Morassutti | 411/512 |
| 5,352,066 A * | 10/1994 | Schaeffer et al. | 405/259.6 |
| 6,837,658 B2 * | 1/2005 | Nehl | 411/36 |
| 2002/0071727 A1 * | 6/2002 | Kaibach | 405/259.1 |
| 2003/0156921 A1 * | 8/2003 | Nagawa et al. | 411/411 |
| 2004/0052606 A1 * | 3/2004 | Kerl | 411/80.1 |
| 2004/0202522 A1 * | 10/2004 | Cabrele | 411/80.1 |
| 2005/0002751 A1 * | 1/2005 | Holland et al. | 411/80.1 |

FOREIGN PATENT DOCUMENTS

| | | |
|---|---|---|
| CH | 654833 A5 | 3/1986 |
| EP | 0732515 A1 | 9/1996 |
| FR | 2700816 A1 | 7/1994 |
| FR | 2865249 A1 | 7/2005 |
| IT | 598490 B | 10/1959 |
| NL | 7807993 | 1/1979 |

OTHER PUBLICATIONS

EP Search Report for EP07114210 mailed Dec. 9, 2009.

* cited by examiner

ANCHOR DEVICE OF WOODEN OR METAL STRUCTURES TO A WALL

RELATED APPLICATIONS

The present application is based on, and claims priority from, Italy Application Number TO2006A 000599, filed Aug. 11, 2006, the disclosure of which is hereby incorporated by reference herein in its entirety.

The present invention relates to an anchor device adapted to be used in the constructions sector for anchoring wooden and/or metallic structures to a wall or to a body to which the following description will make explicit reference without because of this loosing in generality.

BACKGROUND OF THE INVENTION

It is know that most of the currently known anchor devices comprise an expansion bolt and a fastening screw adapted to be inserted and screwed into the bolt to determine the expansion of the same inside the wall. Specifically, the bolt typically consists of a deformable tubular element formed by plastic or metallic material, which is adapted to be inserted in a hole obtained in a wall, in a body or in an anchor element, with its longitudinal axis coaxial to the axis of the hole itself.

In the above-mentioned expansion bolts, the tubular element normally consists of a deformable central shank, of a head connected to a first end of the central shank, and of a cylindrical collar, which is connected to a second end of the central shank and is provided with an annular abutment flange.

Unfortunately, the structure of the above-described expansion bolts is such to allow an effective anchoring only on given types of wall, i.e. for a specific application, but is inadequate when the bolt must be used for anchoring onto walls having structural features different from those contemplated for the application the expansion bolt has been designed for.

Specifically, the expansion bolts of the above-mentioned anchor devices are not capable of ensuring an effective fastening, i.e. do not present an adequate operation to be used in all the following applications: anchoring on walls made with bricks provided with reciprocally distanced internal webs delimiting voids or spaces filled with low-consistency material; and/or anchoring on walls made with a relatively friable or heterogeneous material, such as for example plywood walls, walls made of coarse, not very compact concrete; and/ or anchoring on walls made of compact materials i.e. having a high consistency, such as for example concrete walls or natural stone walls or walls made of solid bricks, i.e. filled with high consistency material.

SUMMARY OF THE INVENTION

It is the object of the present invention to make an anchor device provided with a multifunctional expansion bolt, i.e. which is capable of ensuring an effective anchoring on different types of walls.

According to the present invention, an anchor device as described in claim 1 and preferably, but not necessarily, in any of the dependent claims is made.

BRIEF DESCRIPTION OF THE DRAWINGS

The present invention will now be described with reference to the accompanying drawings which illustrate a non-limitative embodiment thereof, in which.

DETAILED DESCRIPTION OF THE INVENTION

With reference to the accompanying figures, numeral 1 indicates as a whole a multifunctional anchor device, which is particularly suitable for anchoring structural wooden and/or metal elements to walls made of bricks provided with reciprocally distanced internal webs delimiting voids or spaces filled with low-consistency material; and/or walls made of relative friable or heterogeneous material, such as for example plywood walls, walls made of coarse non very compact concrete; and/or walls made of compact materials i.e. having a high consistency, such as for example concrete walls or natural stone walls or walls made of solid bricks, i.e. filled with high-consistency material.

Anchor device 1 essentially comprises an expansion bolt 2 adapted to be inserted in a hole (not shown) obtained in one of the above-mentioned walls with its longitudinal axis A coaxial to the longitudinal axis of the hole itself, and a fastening screw 3 (only partially shown in FIG. 1), which is adapted to be inserted in expansion bolt 2 to cause a plastic deformation of the same inside the hole as described in detail below so as to determine the fastening of anchor device 1 and thus of bolt 2 to the wall itself.

Expansion bolt 2 essentially consists of an elongated deformable tubular body preferably, but not necessarily, formed by plastic material, comprising a central shank 4, a head 5 and a collar 6, which are arranged respectively at the opposite ends of central shank 4 and are integrally formed with the same.

Collar 6 is arranged coaxial to axis A and is provided, at its end, with an annular flange, which is adapted to be abuttingly arranged on the external surface of the wall or of the element to be fastened in use, so as to ensure the correct longitudinal position of bolt 2 inside the hole.

Head 5 instead consists of a full solid body of essentially ogival shape which is stably connected to central shank 4 and is adapted to facilitate the introduction of the entire bolt 2 inside the hole without damaging the internal wall of the same, specifically when the latter is obtained in internal webs of material having a low consistency.

Head 5 presents a series of longitudinal slots 7, which are developed on the body of head 5 itself so as to delimit a series of anchor segments 8 adapted in use to radially expand, under the bias of fastening screw 3, so as to determine an anchoring of expansion bolt 2 on the innermost portion of the hole.

Figure 1:
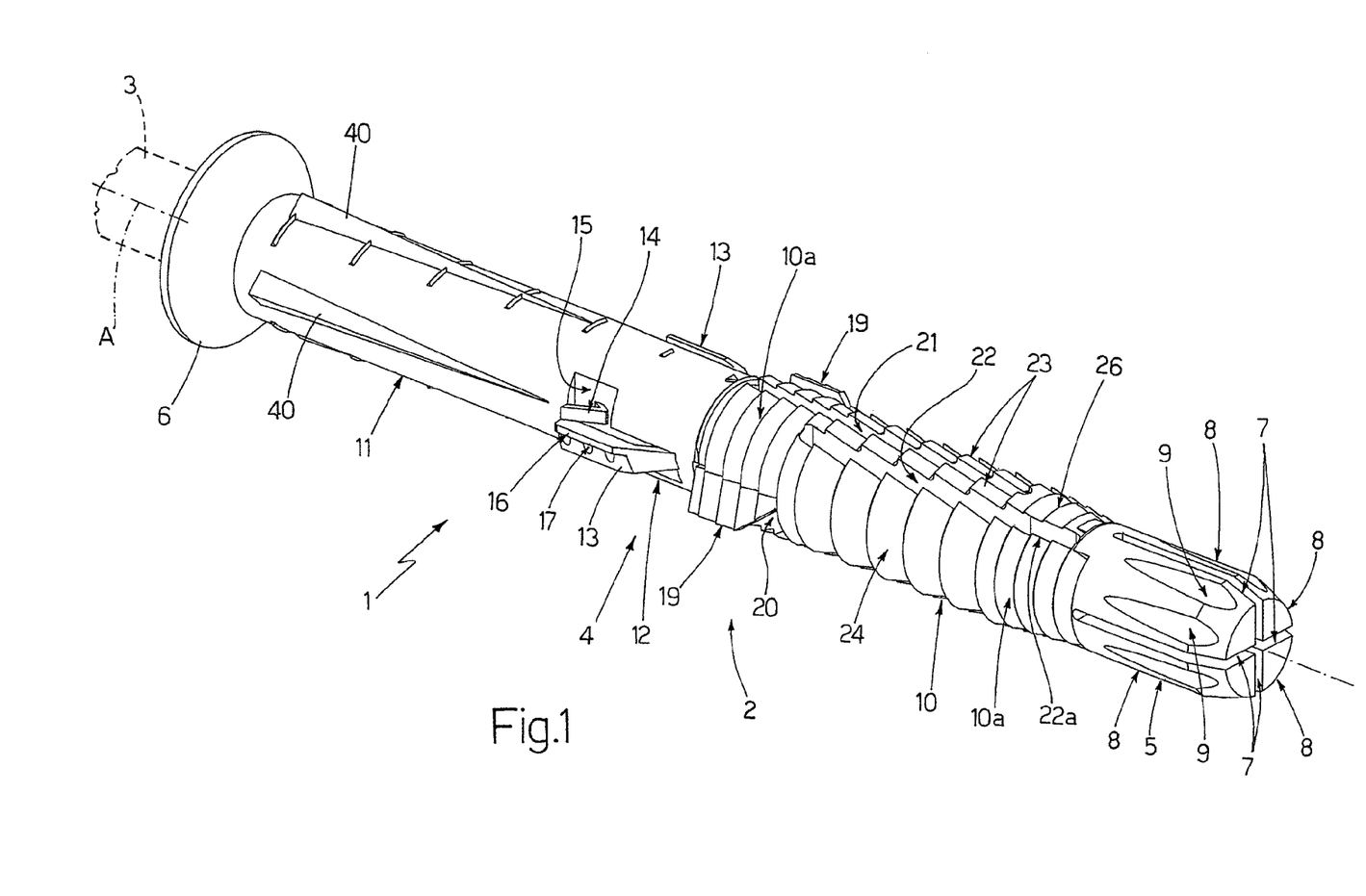
FIG. 1 is a perspective view of an anchor device made according to the present invention.
Figure 2:
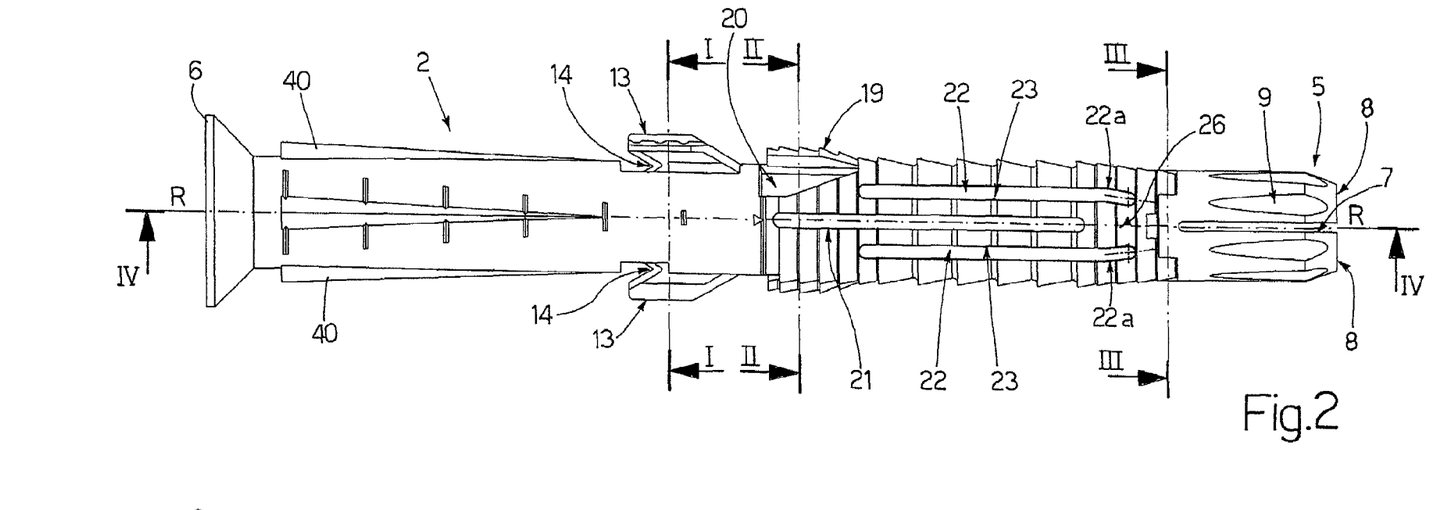
FIG. 2 is a first side view of an expansion bolt of the anchor device shown in FIG. 1.
Figure 3:
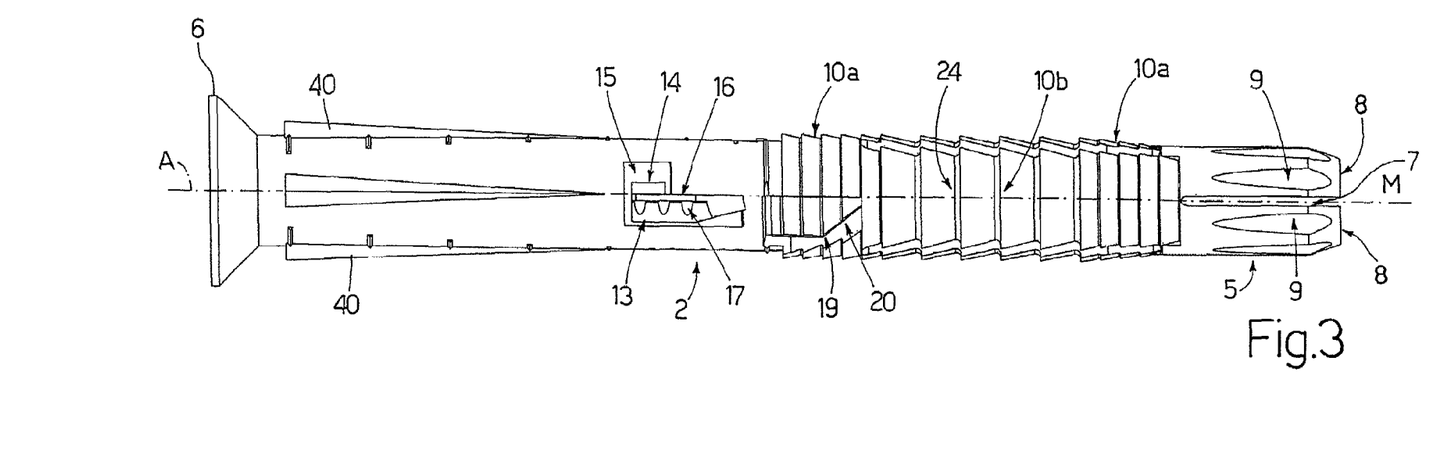
FIG. 3 is a second side view of the expansion bolt of the anchor device shown in FIG. 1.

In the case in point, in the example shown in FIGS. 1-3, head 5 presents four longitudinal slots 7, two of which lay on a middle plane M of expansion bolt 2, while the other two lay on a reference plane R essentially orthogonal to the middle plane M itself.

More in detail, the four longitudinal slots 7 delimit four anchor segments 8 which, in use, under the bias of fastening screw 3 progressively spread outwards (in the manner shown in FIG. 9) so as to radially displace their free ends in reciprocally opposite directions.

Furthermore, longitudinal recesses or grooves 9 are along obtained on the external surface of each anchor segment 8, which recesses or grooves are reciprocally and angularly spaced out, extend parallelly to axis A and are adapted, on one hand to increase the flexibility of anchor segments 8 and on the other hand to increase the contact surface, and thus the friction, between head 5 and internal wall of the hole when bolt 2 is inserted inside the hole itself.

It is must be noted that a better grip of bolt 2 to the internal wall of the hole is obtained by increasing the contact surface of head 5, thus determining an increase of friction and consequently a better anchoring of bolt 2 onto walls or bricks made with low consistency materials.

Central shank 4 is essentially subdivided into three segments or portions, the first of which, hereinafter indicated as deformable portion 10, is arranged immediately next to head 5 and is adapted to be partially deformed under the bias of fastening screw 3 in the manner described in detail below; a second portion, indicated hereinafter as support portion 11, is arranged at collar 6 and is adapted to be arranged in use in contact with an initial segment of the internal surface of the hole; while a third portion, indicated hereinafter as intermediate portion 12, is arranged between support portion 11 and deformable portion 10 and is adapted to prevent and/or contrast the rotation of expansion bolt 2 about axis A when the latter is inserted in the hole and fastening screw 3 is operated.

Support portion 11 has an essentially smooth cylindrical shape and is provided on its external surface with a series of angularly and reciprocally spaced longitudinal protrusions 10, which are adapted to contrast the rotation of bolt 2 when the latter is inserted in the hole. In the case in point, longitudinal protrusions 40 are shaped so as to present an essentially triangular shape and extend parallelly and equally distanced from collar 6 towards intermediate portion 12. More in detail, longitudinal protrusions 40 are arranged in pairs on middle plane M and on reference plane R respectively and present a progressively decreasing height towards intermediate portion 12.

Intermediate portion 12 is instead provided with a pair of anti-rotation fins 13 of essentially rectangular shape which protrudingly extend from the external wall so as to be arranged essentially coplanar to middle plane M and are essentially folded as an L so that the corresponding end segment is essentially parallel to longitudinal axis A and faces collar 6.

Specifically, with reference to FIGS. 1-4, the end segment of each anti-rotation fin 13 is connected to central shank 4 by means of a flexible appendix 14, which is structured so as to contrast the twisting i.e. the swerving of anti-rotation fin 13 with respect to a corresponding laying position on middle plane M when bolt 2 is subjected to a rotation inside the hole. More in detail, in use, when bolt 2 is rotated anticlockwise in the hole, flexible appendixes 14 maintain the corresponding anti-rotation fins 13 essentially parallel to axis A increasing in this manner the contrast action to the rotation of bolt 2.

Figure 4:
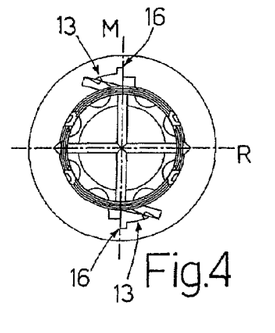
FIG. 4 shows the expansion bolt of the anchor device taken along a section I-I in FIG. 2 on a magnified scale.

With reference to FIGS. 1 and 4, in order to further increase the contrast to the rotation movement of bolt 2 inside the hole, each anti-rotation fin 13 is provided with a protruding ridge 16, which is developed on the end segment of anti-rotation fin 13 itself in a direction parallel to axis A so as not to interfere with the insertion of bolt 2 in the hole; and a series of transversal recesses 17, which are obtained on the external face of end segment of anti-rotation fin 13 so as to increase the friction thereof inside the hole.

Flexible appendix 14 has an essentially V-shaped profile and defines an elastic element having the function of maintaining anti-rotation fin 13 in an extracted position and concurrently is adapted to elastically contrast the bending of anti-rotation fin 13 itself towards the wall of intermediate portion 12 when bolt 2 is inserted in the hole.

In the example shown in FIG. 1, a seat 15 is also obtained on the body of intermediate portion 12, at each flexible appendix 14, which seat is shaped so as to be able to accommodate there within anti-rotation fin 13 and corresponding flexible appendix 14 when bolt 2 is engaged inside the hole.

Specifically, with reference to the example shown in FIGS. 1 and 3, each seat 15 is essentially L-shaped and presents a longer segment which extends parallelly to axis A so as to be able to entirely accommodate anti-rotation fin 13, and smaller segment which extends perpendicularly to the longer segment and is adapted to entirely accommodate flexible appendix 14. More in detail, in use, when bolt 2 is inserted in the hole, anti-rotation fins 13 elastically bend so as to be arranged inside corresponding seats 15 so as to simplify the insertion of bolt 2 inside the hole.

Deformable portion 10 comprises a cylindrical body having an essentially toothed profile and presents, next to intermediate portion 12, a pair of anti-rotation fins 19, which have the function of contrasting the rotation of bolt 2 about longitudinal axis A, preferably clockwise, when bolt 2 itself is completely inserted in the hole and fastening screw 3 is inserted therein.

Specifically, in the example shown in FIGS. 1, 2, 3 and 5, anti-rotation fins 19 protrudingly extend from the external wall of deformable portion 10 in directions tangent to the wall itself. More in detail, each anti-rotation fin 19 lays on a plane which is tangentially arranged with respect to the external wall of deformable portion 9 and is essentially perpendicular to middle plane M of bolt 2.

Figure 5:
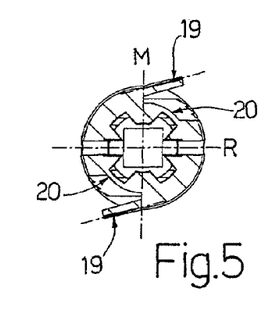
FIG. 5 shows the expansion bolt of the anchor device taken along a section II-II in FIG. 2 on a magnified scale.

In the example shown in FIGS. 1 and 5, anti-rotation fins 19 extend from external wall of deformable portion 10 on diametrically opposite sides with respect to middle plane M and have an essentially trapezoidal shape so as to promote the insertion of bolt 2 inside the hole thus minimising the damage to the internal wall of the hole itself.

Each anti-rotation fin 19 is further adapted to elastically bend when it is inserted in a hole to and from the aforesaid tangential position so as to be arranged in a seat 20 obtained in the body of deformable portion 10.

In the case in point, the two seats 20 have an essentially trapezoidal shape so as to be able to internally contain anti-rotation fins 19 in the corresponding bent position and thus promote the insertion of the entire bolt 2 in the hole.

With reference to FIGS. 1 and 2, deformable portion 10 further presents three pairs of longitudinal through slots, which extend along rectilinear directions parallel to axis A and lay on corresponding planes, which are arranged perpendicular to middle plane M and respectively distanced.

Specifically, the three pairs of longitudinal through slots comprise a pair of central rectilinear through slots 21 which lay on a reference plane R aligned with a pair of longitudinal slots 7 of head 5; and a pair of external rectilinear through slots 22, which are arranged on opposite sides of each central through slot 21 on parallel reference planes but not coinciding with reference plane R.

Each central through slot 21 delimits a pair of main longitudinal tabs 23 with the two immediately adjacent external through slots 22 on the body of deformable portion 10, while each external through slot 22 delimits a secondary longitudinal tab 24 with an adjacent external through slot 22 on the body of deformable portion 9.

In the example shown in FIGS. 1 and 2, the two pairs of external through slots 22 are in an advanced position along axis A with respect to the pair of central through slots 21, i.e. extend towards head 4, beyond the ends of central through slots 21 facing head 4 itself so as to present corresponding end segments 22a reciprocally converging towards reference plane R. The two pairs of end segments 22a of external through segments 22 reciprocally delimit two stiffening segments 26 (only one of which is shown in FIGS. 1 and 2), which are structured so as to delay the radial expansion of deformable portion 11 with respect to the spreading of head 5, and to reduce the radial deformation of deformable portion 10 facing the head 5 itself.

Specifically, the misalignment of external through slots 22 with respect to central through slots 21 determines a stiffening of the end of deformable portion 10, which causes a delay of the radial expansion of deformable portion 10 with respect to the spreading of anchor segment 8, during the operation of fastening screw 3.

It must further be noted that the central segment of deformable portion 10 in which the three pairs of thought slots 21 and 22 face each other is subject to a greater radial deformation than the end segment of deformable portion 10 in which the two stiffening segments 26 are present, and than the end segment opposite first deformable portion 10 facing collar 6, in which only the extension of the pair of central through slots 21 is present with respect to external through slots 22.

Therefore, the structure of deformable portion 10 associated to the misalignment of through slots 21 and 22 at head 5 advantageously allows to obtain a function which contemplates the deformation of deformable portion 10 only following the completion of the spreading of anchor segments 8, i.e. following the complete angular locking of the internal end of bolt 2 to a possible web inside the wall. In this manner, any rotation of bolt 2 about its axis A is cut to zero, rotation which in the known bolts causes the damage of the internal wall of the hole in which the bolt is inserted thus compromising the anchoring of the device.

With reference to FIGS. 1 and 3, deformable portion 10 presents two end segments 10a having a toothed profile in which the crests are arranged at a first distance one from the other; and a central segment 10b arranged between the two end segments having a toothed profile in which the crests are arranged at a second distance greater than the first distance. Specifically, the crests of central segment 10b of deformable portion 10 have a first height measured with respect to the external wall of deformable portion 10, while the crests in the two end segments of deformable portion 10 have a second height smaller than the first height.

Concerning the description above, it must be noted that the different heights and distances of the crests of external segments 10a with respect to the crests of the toothed profile obtained on central segment 10b, allow to conveniently obtain less damage to the internal surface of the holes obtained on walls with internal webs, when the crests of the profile come into contact with the latter, and a higher contact surface of bolt 2 with the internal surface of the hole itself, and therefore a greater friction of central shank 4 in at the webs.

Figure 7:
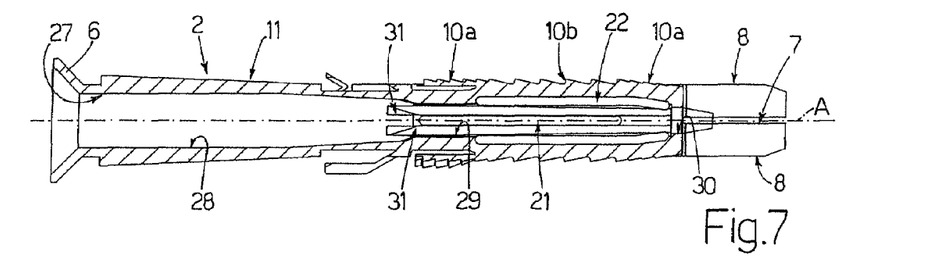
FIG. 7 shows the expansion bolt of the anchor device taken along a section IV-IV in FIG. 3.

With reference to FIG. 7, bolt 2 presents a hole 27, which extends coaxially to longitudinal axis A ad is adapted to accommodate there within the shank of fastening screw 3, which in use is adapted to progressively spread anchor segments 8 and then radially expand deformable portion 10 outwards so as to determine the fastening of bolt 2 to the wall.

Specifically, in the example shown in FIG. 7, hole 27 of bolt 2 comprises a first segment 28 which is developed from collar 6 along support portion 11 and has an essentially cylindrical shape; a second segment 29, which extends inside deformable portion 10 for the entire length of through slots 21 and 22; and a third segment 30, which extends at the end part of deformable portion 10 between the ends of the pair of central through slots 21 facing towards head 5.

Figure 6:
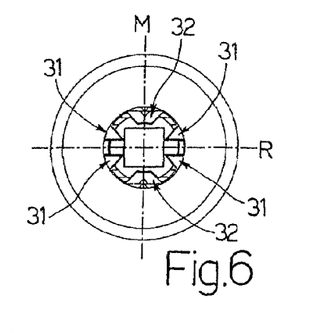
FIG. 6 shows the expansion bolt of the anchor device taken along a section III-III in FIG. 2 on a magnified scale.

With reference to FIGS. 6 and 7, second segment 29 is provided with a series of longitudinal protruding ribs, which extend parallel to axis A along the entire length of second segment 29 itself and are angularly and reciprocally spaced apart so that hole 27 presents an essentially star-shaped section.

Specifically, in the example shown in FIG. 7, four main longitudinal protruding ribs 31 have an essentially triangular section and are each associated to a corresponding main longitudinal tab 23, while two secondary protruding longitudinal ribs 32 lay on middle plane M facing each other, present an essentially trapezoidal section and are each associated to a secondary longitudinal tab 24.

Finally, third segment 30 of hole 27 presents an essentially parallelepiped shape which partially extends inside head 5 so as to allow the tip portion of the screw to be easily inserted between the four anchor segment 8 so as to progressively spread them following the screwing of the fastening screw 3.

Figure 8:
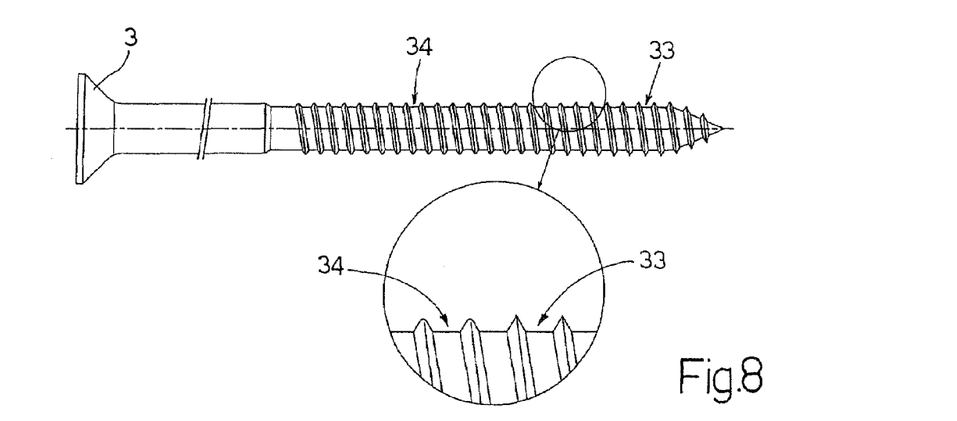
FIG. 8 shows a side view with a magnified portion, removed for clarity, of the fastening screw of the anchor device shown in FIG. 1.

Fastening screw 3 of anchor device 1, in the example shown in FIG. 8, is provided with a shank presenting a threaded portion subdivided into two different threaded segments, of which a threaded end segment 33 is arranged at the tip of fastening screw 2 and has a threading which presents sharp crests so as to conveniently cut into the inner wall of hole 27, during the operation of fastening screw 3, causing an extremely limited outward radial expansion of bolt 2; while an initial threaded segment 34 has a threading presenting rounded crests i.e. chamfered, so as to cause a high outward radial expansion of the bolt.

In order to obtain a maximum radial deformation of bolt 2 at the central segment of deformable portion 10 and concurrently a minimum radial expansion of bolt 2 at the end portion of deformable portion 10 itself facing head 5, threaded segments 33 and 34 may be advantageously dimensioned so that the length of initial threaded segment 34 of fastening screw 2 is approximately as long as the central segment of deformable portion 10; and the length of threaded end segment 33 is approximately equal to the sum of the length of head 5 plus the length of the end segment of deformable portion 10 facing head 5 itself.

As described above, in virtue of the dimensional relationship between the lengths of threaded segments 33 and 34 of fastening screw 3 and the lengths of the portions of central shank 4 of bolt 2, on one hand a greater deformation of deformable portion 10 is obtained because the rounded profile of the crests is taken exactly to the corresponding segment to be deformed causing a particularly effective outward radial thrust on main longitudinal tabs 23 and secondary longitudinal tabs 24, and on the other hand a smaller outward deformation and a greater traction force of the screw on the portions of bolt 2 which must be approached are obtained.

The operation of anchor device 1 varies according to the type of wall to which it is anchored.

Figure 9:
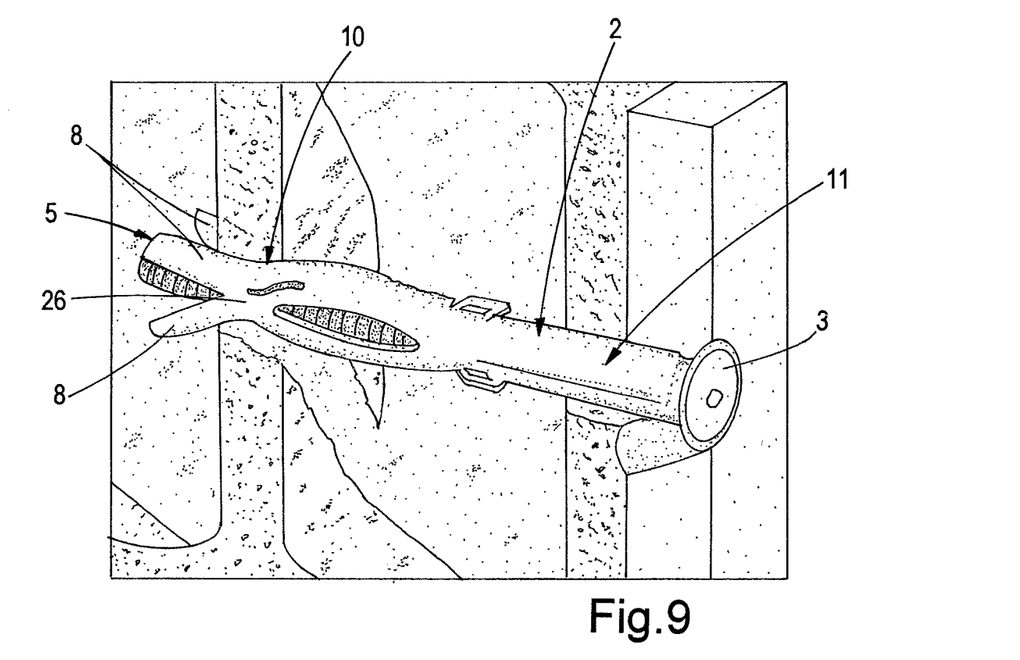
FIG. 9 shows a first operation of the anchor device shown in FIG. 1 during the fastening to a wall provided with internal webs.

FIG. 9 shows an example of operation of anchor device 1, in which bolt 2 is inserted in a hole obtained in a wall provided with a pair of reciprocally distanced webs delimiting an internal void. In detail, bolt 2 is inserted in the hole obtained in the two webs so as to present a segment of support portion 11 and an end segment of deformable portion 10 inserted in the holes obtained in the two internal webs of the wall.

When fastening screw 3 is screwed into hole 27 of bolt 2, the end segment of the same cuts into and progressively crosses central shank 4 to reach the internal part of head 5 causing a gradual spreading of the four anchor segments 8, which radially open and angularly lock the internal end of bolt 2 to the web inside the wall. It must be noted that the angular locking of the internal end of bolt 2 considerably reduces the damage inside the wall of the hole of the internal web because it prevents the rotation of bolt 2, and ensures a good anchor in the innermost part of the hole itself.

Following the completion of the spreading and thus the angular locking of the internal end of bolt 2 on internal web, a further fastening of fastening screw 3 determines a retraction of head 5 towards collar 6, causing an outward radial expansion of deformable portion 10.

It must be noted that during this step, in virtue of the presence of stiffening segments 26, the four main longitudinal tabs 23 and the two secondary longitudinal tabs 24 each radially expand in the six corresponding directions only following the completion of the spreading of anchor segments 8. Specifically, the longitudinal structure of through slots 21, 22 and thrust of tabs 23 and 24 greatly limits possible movements of the same about axis A during the radial expansion, determining in this manner an advantageous reduction of the damage to the internal wall of the hole obtained in the web in which bolt is inserted 2.

At this point, the screwing of fastening screw 3 causes a gradual radial expansion of main tabs 23 and secondary tabs 24, which determine along with anchor segments 8, a fastening of bolt 2 on opposite faces of the internal web, thus ensuring the internal locking of bolt 2 itself to the wall.

If the distance between the webs is greater than the length of bolt 2, i.e. if head 5 remains free (not inserted inside the hole obtained in the internal web), the operation of fastening screw 3 determines a radial expansion of head 5 and of deformable portion 10 and contextually a gradual retraction of head 5 itself towards deformable portion 10. Such retraction is ensured by the longitudinal traction exerted by threaded segment 33 with sharp crests of fastening screw 3, which instead of actuating an outward thrust of the body of bolt 2 cut into the internal wall of hole 27 actuating a traction force towards collar 6. In this case, the retraction of head 5 causes a progressive radial expansion of deformable portion 10 which ends with the collapse of the same. Following the collapse, the fastening of fastening screw 3 causes the rotation of head 5 and of deformable portion 10 about axis A, which progressively twists about screw 2 forming a securing knot along with head 5. A further screwing of fastening screw 3 determines the retraction of the securing knot which progressively abuts on the internal face of the web, thus securing bolt 2 with collar 5 onto the two faces of the external wall.

Figure 10:
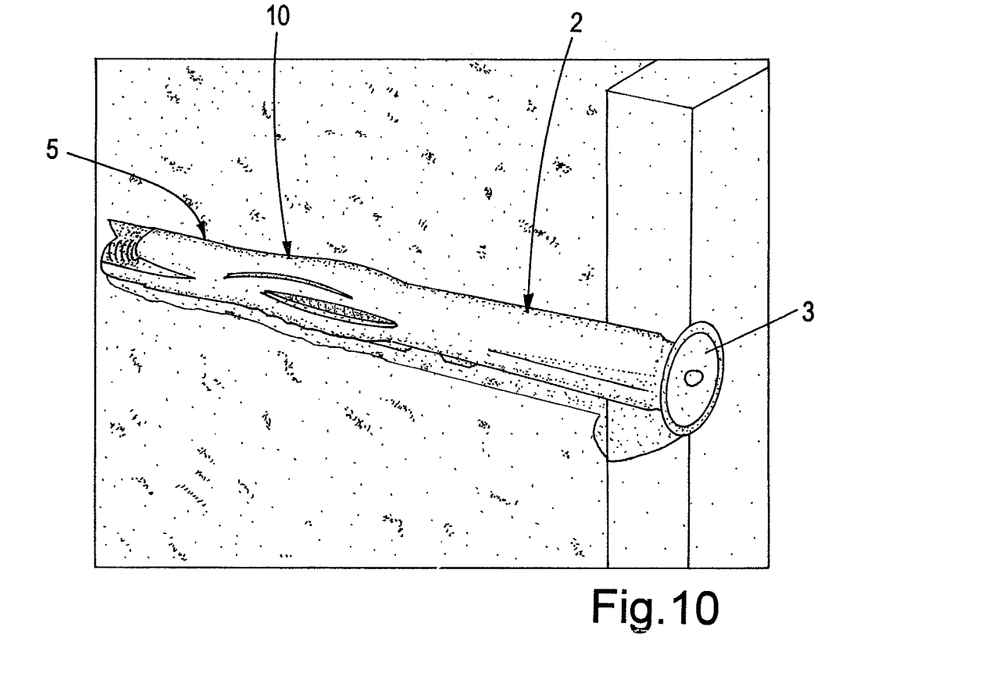
FIG. 10 shows a second operation of the anchor device shown in FIG. 1 during the fastening of the same to a wall internally made with highly compact material.

FIG. 10 instead shows the operation of anchor device 1 on a wall made of compact material, i.e. having a high consistency, such as for example a concrete wall. In this case, the screwing of fastening screw 3 in bolt 2 determines a radial expansion of head 5 and subsequently of deformable portion 10. It must be noted that in this case, segment 34 of the threading of screw 3 with rounded crests contribute to increasing the outward radial thrust exerted by fastening screw 3 on deformable portion 10 and that such thrust increases the volume of the "carrying capacity cone" of bolt 2, thus allowing the anchoring of heavy loads.

Anchor device 1 described above presents the major advantage of being multifunctional because the corresponding bolt 2 is capable of modifying its functional behaviour according to the type of wall into which it is inserted, always ensuring an excellent anchoring.

Specifically, in case of fastening to walls with internal webs, the spreading of the head anticipated with respect to the radial deformation of the deformable portion ensures an immediate angular locking and reduces the damage to the internal surface of the hole obtained in the internal web ensuring at the same time an excellent internal fastening which allows to obtain an increase of the shearing loads withstandable by the anchor device.

Furthermore, the presence of the toothed profile on the deformable portion subdivided into segments with crests of different heights and distances contributes to further reducing the damage to the internal surface of the holes obtained in webs formed by low consistency material, thus improving anchoring.

Indeed, the segments with differentiated threading made on fastening screw 3 allow to optimise the cutting and thus the longitudinal traction or outward radial thrust of the bolt according to the wall type to which the bolt itself is anchored.

From the description above, it must be noted that anchor device 1 is capable of operating also by coupling a fastening screw of the traditional known type to bolt 2.

It is finally apparent that changes and variants can be made to that described and shown herein without departing from the scope of protection of the present invention.

The invention claimed is:

1. An anchor device comprising an expansion bolt which in turn comprises a tubular body, which is provided with a hole which extends along the longitudinal axis of the tubular body to accommodate a fastening screw; the tubular body comprising a central shank and a head integral with said central shank; said head comprising a full solid body through which a pair of longitudinal reciprocally perpendicular through slots are made which delimit at least four anchor segments adapted to spread outwards under the bias of the fastening screw; and in which said central shank comprises a first portion, which is arranged next to said head and presents a plurality of longitudinal through slots essentially orthogonal to a middle plane of the bolt, each of which develops along said first portion parallelly to said longitudinal axis so as to define with an adjacent longitudinal through slot a longitudinal anchoring tab, which is adapted to expand radially outwards under the bias of the fastening screw in which said first portion of the central shank of said bolt presents two end segments having a toothed profile in which the crests are arranged at a first distance one from the other; and a central segment arranged between the two end segments having a toothed profile in which the crests are arranged at a second distance higher that said first distance.

2. An anchor device according to claim 1, in which in said bolt the crests of the central segment of said first portion have a first height measured with respect to the external wall of said first portion; while the crests in the two end segments of the first portion itself are smaller in height than said first height.

3. An anchor device comprising an expansion bolt which in turn comprises a tubular body, which is provided with a hole which extends along the longitudinal axis of the tubular body to accommodate a fastening screw; the tubular body comprising a central shank and a head integral with said central shank; said head comprising a full solid body through which a pair of longitudinal reciprocally perpendicular through slots are made which delimit at least four anchor segments adapted to spread outwards under the bias of the fastening screw; and in which said central shank comprises a first portion, which is arranged next to said head and presents a plurality of longitudinal through slots essentially orthogonal to a middle plane of the bolt, each of which develops along said first portion parallelly to said longitudinal axis so as to define with an adjacent longitudinal through slot a longitudinal anchoring tab, which is adapted to expand radially outwards under the bias of the fastening screw in which said central shank of the bolt comprises a second, essentially smooth portion comprising at least one pair of anti-rotation fins, which lay on said middle plane and are adapted to contrast the rotation of said bolt about said longitudinal axis; each said anti-rotation fin being connected to the external wall of said second portion by means of a flexible appendix, which is structured so as to contrast the swerving of the anti-rotation fin with respect to a respective laying portion on said middle plane, when said bolt is turned within a hole.

4. An anchor device according to claim 3, in which said second portion of the bolt comprises a pair of seats, each of which is structured to accommodate an anti-rotation fin and the respective flexible appendix when the bolt is introduced in a hole.

* * * * *